(12) United States Patent
Poston et al.

(10) Patent No.: US 8,051,990 B2
(45) Date of Patent: Nov. 8, 2011

(54) OIL CANNING OF MESH SCREEN FOR FILTER

(75) Inventors: Daniel R. Poston, Plainfield, IL (US); Richard A. Wozniak, Tinley Park, IL (US); Mark Riha, Tinley Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/966,012

(22) Filed: Dec. 13, 2010

(65) Prior Publication Data
US 2011/0088837 A1    Apr. 21, 2011

Related U.S. Application Data

(60) Division of application No. 12/189,611, filed on Aug. 11, 2008, now abandoned, which is a continuation of application No. 11/172,720, filed on Jul. 1, 2005, now abandoned.

(51) Int. Cl.
*B01D 29/31* (2006.01)
*B01D 39/10* (2006.01)
*B29C 61/00* (2006.01)

(52) U.S. Cl. ..... 210/499; 210/483; 156/424; 29/896.62; 264/230

(58) Field of Classification Search ............... None
See application file for complete search history.

(56) References Cited

U.S. PATENT DOCUMENTS 5,766,472 A * 6/1998 Tzakis ................... 210/485
6,547,255 B1 * 4/2003 Donaway et al. .......... 277/602

FOREIGN PATENT DOCUMENTS

JP          401115421 A * 5/1989

* cited by examiner

*Primary Examiner* — Benjamin Kurtz
(74) *Attorney, Agent, or Firm* — Mark W. Croll; Paul F. Donovan

(57) ABSTRACT

A method of reducing if not eliminating the possibility of tearing or ripping of a mesh screen of a filter during the manufacturing process includes the step of intentionally deforming the mesh screen. With this technique, as the plastic material that forms the frame of the filter begins to expand or change shape, as a result of the heating and squeezing steps involved with the molding process, the deformed mesh screen will be able to accommodate the relative changes in shape without tearing or ripping of the mesh screen. With the invention, numerous shapes and configurations of tools may be used to provide the intentional deformation of the mesh screen during the manufacturing process as well as to provide for control over the amount and degree of mesh screen deformation. Also, the resulting filter will have a mesh screen that has improved retention capabilities which will enhance the performance of the filter.

7 Claims, 3 Drawing Sheets

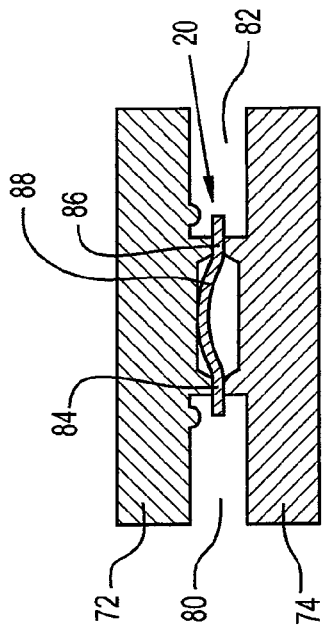
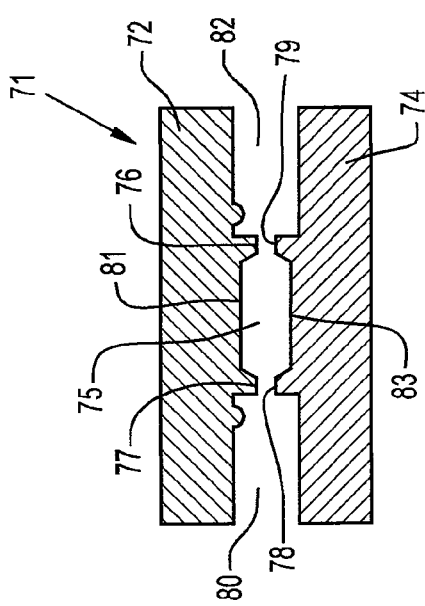
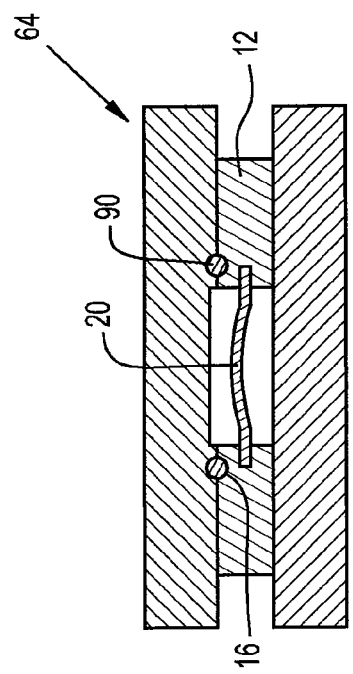

OIL CANNING OF MESH SCREEN FOR FILTER

CROSS-REFERENCE TO RELATED APPLICATIONS

This application is a divisional of United States patent application Ser. No. 12/189,611 filed on Aug. 11, 2008, now abandoned which is a continuation of U.S. patent application Ser. No. 11/172,720 filed on Jul. 1, 2005, which is now abandoned.

FIELD OF THE INVENTION

The present invention relates generally to the manufacture of filters for automotive applications and more specifically to deforming the mesh screen of the filter to allow for expansion of the filter frame and the mesh screen during the manufacture of the filter.

BACKGROUND OF THE INVENTION

It is known that in automatic transmissions of vehicles, for example, a transmission filter is used on the inlet side of the transmission hydraulic pump. The transmission filter, typically a fine mesh screen or similar filtering media, prevents harmful contaminants from entering the hydraulic system where they can increase wear and cause scoring and sticking of hydraulic control valves. If a major part fails inside the transmission, the transmission filter may prevent pieces of that part from contributing to a more catastrophic transmission failure. Normally, transmission filters trap metal chips from parts such as gears and bushings and the normal fine material that results from wear of the hydraulic clutch facings and bands.

The known transmission filters are typically made of a plastic material formed as a frame around a mesh screen—the plastic frame molded into the desired configuration and onto the mesh screen. A rubber seal may be added to or molded with the frame. The rubber seal is used to seal the filter onto the inlet side of the hydraulic pump.

The known transmission filters, however, are currently manufactured using techniques that have certain drawbacks. For example, the molded plastic frame that forms the perimeter or outer edge of the filter also forms individual, smaller sections or windows within the frame. The mesh screen extends across some or all of the smaller sections or windows, creating individual filter sections. Depending on the application, a filter may have one or more individual sections or windows within the filter, with each section having a unique shape and configuration. As a result, the filter must be molded to form each of these individual sections or windows. During the molding process, the plastic material that forms the frame of the filter is typically injection molded in the desired configuration and molded at an elevated temperature over the screen sections. At this elevated temperature, the plastic material that forms the frame and individual sections may change shape and consequently may stretch the mesh screen material that extends across the individual section, sometimes to the point of tearing or ripping of the mesh screen material. In other applications, where a rubber seal is added to the filter, a liquid injection molding process is used where the rubber seal is pressed or squeezed onto the filter frame at an elevated temperature. In these applications, the elevated temperature and the pressing of the rubber seal causes the plastic material that forms the frame to expand or change shape resulting in the stretching of the mesh screen, again sometimes to the point of tearing or ripping of the mesh screen.

The present invention is directed at overcoming the known problem of tearing or ripping of the mesh screen as well as other known drawbacks with respect to the manufacture of filters and more broadly the application of molded plastic onto a mesh screen material.

SUMMARY OF THE INVENTION

The present invention is directed to a technique for reducing, if not eliminating, the tendency of tearing or ripping of the mesh screen of a filter during the manufacturing process. With the teachings of the invention, the mesh screen is intentionally deformed to provide the mesh screen with a domed shape to provide an "oil canned" effect. With this configuration, as the plastic material that forms the frame of the filter begins to expand or change shape as a result of the heating and squeezing steps involved with the manufacturing process, the domed mesh screen will also be able to move by flattening and stretch without the potential of tearing or ripping of the mesh screen. The invention contemplates numerous shapes and configurations of tools that will provide the desired "oil canned" effect or intentional deformation of the mesh screen during the manufacturing process. The invention provides for control over the amount and degree of mesh screen deformation, as well as improving the retention forces on the mesh screen which improves the performance of the filter. The invention may be used with the manufacture of numerous types of filters and is also applicable to the manufacture of any part that requires the molding of a mesh screen material to a plastic material.

Other features and advantages of the invention will become apparent to those skilled in the art upon review of the following detailed description, claims and drawings in which like numerals are used to designate like features.

BRIEF DESCRIPTION OF THE DRAWINGS

FIG. 6 is a partial cross-section view of another tool used to hold the mesh screen during the manufacture of the filter according to the present invention.

FIG. 7 is a partial cross-section view of the tool of FIG. 6 with mesh screen material held therein for subsequent molding of a frame thereon.

FIG. 8 is a partial cross-section view of a filter of the present invention shown in a tool used to apply a seal to the frame of the filter.

Figure 1:
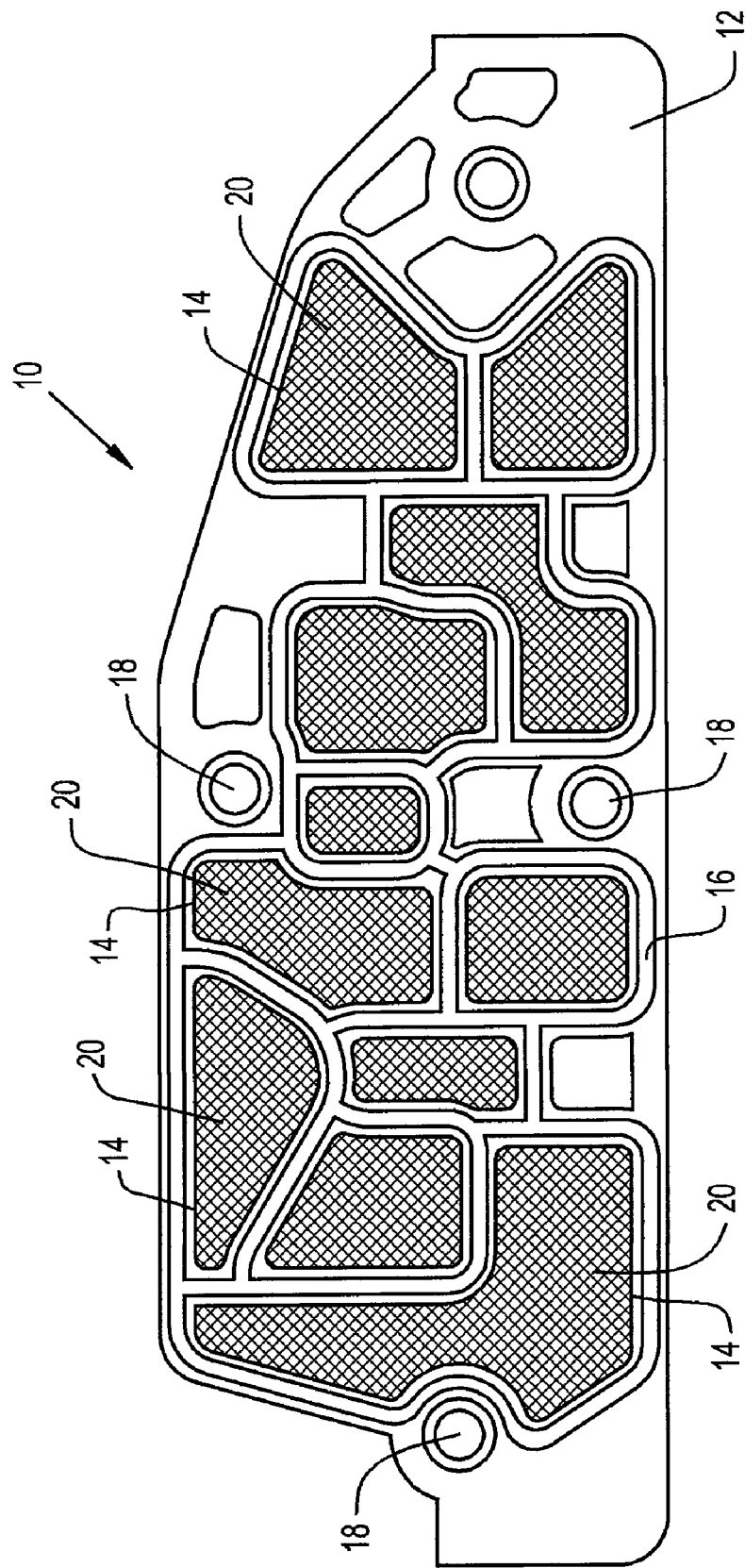
FIG. 1 is a plan view of an exemplary embodiment of a filter manufactured according to the teachings of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Referring to FIG. 1, an exemplary embodiment of a filter 10 made according to the teachings and principles of the present invention is depicted. The filter 10 is exemplary of a transmission filter and is exemplary of the numerous shapes and configurations of the possible filters that may be made according to the teachings of the invention. The filter 10 includes a filter frame 12 that forms or defines numerous frame sections 14. As illustrated, each section 14 may define an opening or window of numerous possible shapes and configurations depending on the desired application. The frame 12 may be made of numerous materials, including a nylon material, such as 33% glass filled nylon 6/6.

The frame 12 may include a track or channel 16 in which a silicone or rubber material may be added during a liquid injection molding process. The silicone or rubber material forms a seal around each of the sections 14 when the filter is installed for use. As illustrated, the track 16 containing the silicone or rubber material forms a continuous track that extends around each of the sections 14, and the silicone or rubber material prevents any leaking around each of these sections. The frame 12 may also include one or more mounting holes 18 that serve to mount the filter 10 at the desired location, such as to the inlet side of a transmission pump.

A mesh screen 20 is formed with the frame 12 using a plastic molding process, as described below. The mesh screen 20 may be made of numerous materials, including a polyester or nylon material, as well as stainless steel, or other suitable material. The mesh screen 20 is configured to extend across the opening defined in each of the sections 14 and serves as a filtering media to filter contaminants from a fluid or liquid, such as transmission fluid, as the fluid or liquid passes through the mesh screen 20.

Figure 2:
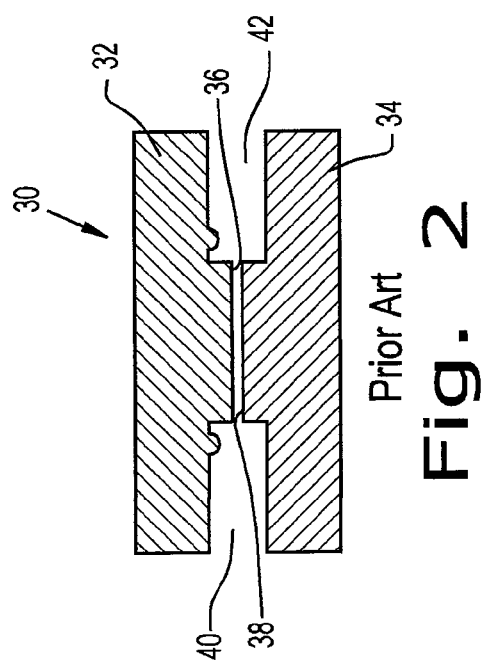
FIG. 2 is a partial cross-section view of a typical tool used to hold the mesh screen during the manufacture of a filter in accordance with the prior art.

Referring to FIG. 2, a cross-section of a known tool 30 that is used to hold the mesh screen in position during a known plastic molding process includes tool halves 32, 34 each having planar, opposing surfaces 36, 38. As known, the surfaces 36, 38 hold the mesh screen during the molding process while the injected plastic material flows through cavities 40, 42 to form the frame 12A. The frame 12A and accompanying mesh screen 20A are then placed in a mold for the liquid injection molding process during which the silicone or rubber material that forms the seal is added to the track 16A, and the frame 12A is squeezed in the mold to define the final configuration of a filter 10A.

Figure 3:
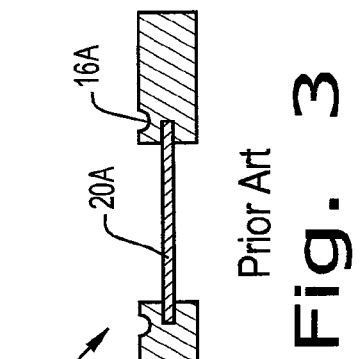
FIG. 3 is a cross-section view of a prior art filter made by the tool of FIG. 2.

FIG. 3 shows a cross-section of the molded frame 12A with the mesh screen 20A extending between portions the frame 12A as formed by the known tool 30 of FIG. 2. As illustrated, the mesh screen 20A is planar or flat to match the shape of the opposing surfaces 36, 38, and is held in position by the frame 12A. With the use of the type of tool 30 depicted in FIG. 2, as the plastic material that forms the frame 12A begins to expand or change shape, as a result of the plastic material being heated to approximately 300 degrees Fahrenheit during the liquid injection molding process and squeezed, the mesh screen 20A, because it is flat or planar and taut, will have a tendency to be stretched between the frame 12A sections, sometimes to the point of tearing or ripping of the mesh screen. More specifically and by way of example, if the frame material consists of a nylon material having a coefficient of thermal expansion ranging from $1.0 \times 10(-5)$ in./in./°F. to $5.0 \times 10(-5)$ in./in./°F., when this material is exposed to a temperature of approximately 300 degrees Fahrenheit, the material may expand linearly approximately 0.0003 to 0.015 inches. This degree of linear expansion may result in the tearing or ripping of the mesh screen 20A that is molded with the frame 12A, which may often have a coefficient of thermal expansion such that linear expansion is less than for frame 12A. Accordingly, the mesh screen is pulled or stretched.

Figure 5:
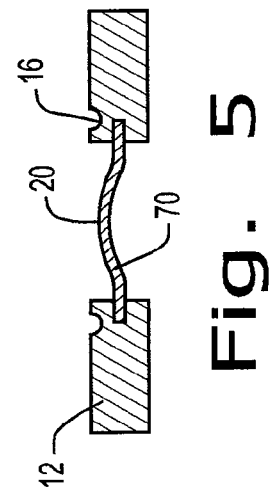
FIG. 5 is a partial cross-section view of the filter made by the tool of FIG. 4.
Figure 4:
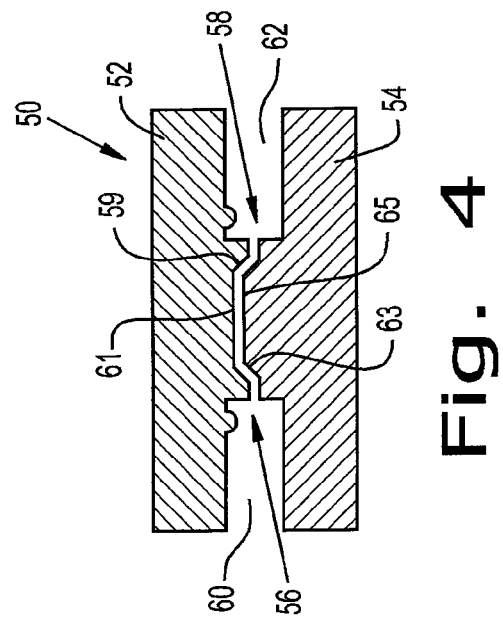
FIG. 4 is a partial cross-section view of a tool used to hold the mesh screen during the manufacture of the filter according to the present invention.

Referring to FIG. 4, a cross-section of a tool 50 that may be used with the teachings of the invention is depicted and includes tool halves 52, 54. The half 52 defines a recess surface 56, and the half 54 defines a boss surface 58. The recess surface 56 may define angled wall surfaces 59 that join with a flat bottom wall surface 61. The boss surface 58 may define angled wall surfaces 63 that join with a flat top wall surface 65. The recess surface 56 and boss surface 58 are mating in that the surfaces 63 and 65 of the boss surface 58 will seat within the surfaces 59 and 61 of the recess surface 56, as illustrated by FIG. 4. The recess and boss surfaces are used to hold the mesh screen 20 in position during the molding process. Importantly, the recess and boss surfaces also intentionally deform the mesh screen 20 to form a dome shaped profile, as illustrated by FIG. 5, thus creating an "oil-canned" effect. As discussed below, the "oil-canned" effect permits the mesh screen 20 to compensate for the relative differences in expansion between frame 12 and mesh screen 20 during the molding process, thereby reducing, if not eliminating the possibility of tearing or ripping of the mesh screen 20 as the plastic frame material expands.

It should be understood that the recess surface 56 and boss surface 58 may have other shapes and configurations, including spherical, angular, flat or curvilinear surfaces, or a combination of these surfaces, that still provide the desired "oil canned" effect or intentional deformation by doming of the mesh screen. It is also contemplated that the tool 50 may be used with all the sections 14 (FIG. 1) to intentionally deform the mesh screen 20 within each of these sections.

Referring to FIG. 4, the tool 50 also defines cavities 60, 62 through which flows the plastic material to form the frame 12 during the plastic molding process. The frame 12 and accompanying mesh screen 20 is then placed in a mold 64 (FIG. 8) for the liquid injection molding process during which the rubber or silicone material is added to the track 16 of the frame 12 and then squeezed in the mold to define the final configuration of the filter 10.

Referring to FIG. 5, there is shown a cross-section of the frame 12 with the deformed mesh screen 20 extending between sections of the frame 12. The mesh screen 20 is intentionally deformed at 70 by the tool 50 to provide the mesh screen with a dome-shaped profile and thus the "oil canned" effect. With this configuration, as the plastic material that forms the frame 12 and sections 14 begins to expand or change shape, as a result of the heating and squeezing of the plastic material as described above, the dome-shaped, deformed mesh screen 20, due to the additional mesh screen material as well as its non-planar shape, will be able to move and compensate for the relative movement between the expanding frame 12 and mesh screen 20, thereby reducing if not eliminating the potential for tearing or ripping of the mesh screen. It should be understood that the invention is not limited to the particular mesh screen deformation depicted at 70, which shows a generally dome-shaped deformation. Rather, the invention contemplates any deformation of the mesh screen 20 that still permits the expansion of the mesh screen without undue stretching in tension. Indeed, any non-planar or non-linear deformation of the mesh screen to compensate for the relative difference in expansion of the frame and mesh screen when subjected to elevated temperature is contemplated with the invention to achieve the benefits of the invention.

Referring to FIG. 6 there is depicted a cross-section of another exemplary tool that may be used with the teachings of the invention. Tool 71 includes tool halves 72, 74 that in use define a cavity 75 formed by raised surface walls 76 and 77 and planar surface wall 81 of the tool half 72, and raised surface walls 78 and 79 and planar surface wall 83 of the tool half 74. With this embodiment, the mesh screen 20 is deformed or squeezed between opposing surface walls 77 and 78 and also between opposing surface walls 76 and 79 during the molding process. The squeezing of the mesh screen is performed adjacent to the frame 12 and for a distance of approximately 1 to 2 millimeters from the frame 12. The intentional deformation or squeezing of the mesh screen 20 at this location causes the mesh screen to be thinned and displace toward the center or middle of the mesh screen to create a bulge in the screen for the "oil-canned" effect, as illustrated by FIG. 7. Similar to the above embodiment, the "oil-canned" effect permits the mesh screen 20 to expand during the molding process, thereby reducing, if not eliminating the possibility of tearing or ripping of the mesh screen 20 as the plastic frame material expands or changes shape.

Similar to the above embodiment, the tool 71 further defines cavities 80, 82 through which flows the plastic material to form the frame 12 during the plastic molding process. As described above, the frame 12 and accompanying mesh screen 20 are then placed in a mold 64 (FIG. 8) for the liquid injection molding process during which the rubber material 90 is added to the track 16 of the frame 12 and squeezed in the mold to form the final configuration of the filter 10. During this manufacturing step, frame 12 is heated by contact with mold 64 for reception of rubber material 90. Heating can cause frame 12 to expand, thereby stretching mesh screen 20. However, the extra material in the dome shape can flatten as necessary, to accommodate the expansion of frame 12 without causing the screen material to stretch or tear. FIG. 8 illustrates a more-flattened dome shape in mesh screen 20 from the expansion of frame 12.

Referring to FIG. 7, there is shown a cross-section of the deformed mesh screen 20 held in the tool 71. With the use of the tool 71, the mesh screen 20 is intentionally deformed or squeezed at mesh portions 84 and 86 by the surface walls 76, 77, 78 and 79 of the tool halves 72, 74. As indicated above, the mesh screen 20 material will be pushed or displaced toward a middle portion 88 that will have a relatively thicker cross-section then the portions 84 and 86. With this configuration, as the plastic material that forms the frame 12 and sections 14 begins to expand or change shape, as a result of the heating and squeezing of the plastic material as described above, the deformed mesh screen 20 will be able to stretch, thereby reducing if not eliminating the potential for tearing or ripping of the mesh screen.

With the principles and teachings of the invention, the amount and degree of mesh screen deformation can be controlled. Also, the invention provides that the "oil canned" effect will be present, thereby reducing if not eliminating the likelihood of the mesh screen ripping or tearing when the plastic material that forms the frame expands or changes shape. In addition, the retention forces on the mesh screen of the final configuration of the filter are improved, thereby permitting more fluid force against the mesh screen during use of the filter without ripping or tearing of the mesh screen.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A method of manufacturing a filter comprising the steps of:
   molding a frame defining a plurality of frame sections having open areas;
   capturing a mesh screen in at least one of the plurality of frame sections within the open area of the section;
   deforming the mesh screen to create a dome in the open area;
   heating the frame with the deformed mesh screen captured in at least one of the plurality of frame sections to apply a seal around at least one of the plurality of frame sections; and
   expanding said frame and flattening said dome by said step of heating the frame.

2. The method of claim 1 further comprising the step of molding the mesh screen across the plurality of frame sections.

3. The method of claim 2 further comprising deforming the mesh screen in each of the plurality of frame sections.

4. The method of claim 3 wherein the step of deforming the mesh screen includes squeezing the mesh screen and causing the mesh screen to bulge.

5. The method of claim 3 wherein the step of deforming the mesh screen includes deforming the mesh screen between a recess surface and a corresponding boss surface.

6. The method of claim 1 wherein the step of deforming the mesh screen includes squeezing the mesh screen and causing the mesh screen to bulge.

7. The method of claim 1 wherein the step of deforming the mesh screen includes deforming the mesh screen between a recess surface and a corresponding boss surface.

* * * * *